UNITED STATES PATENT OFFICE.

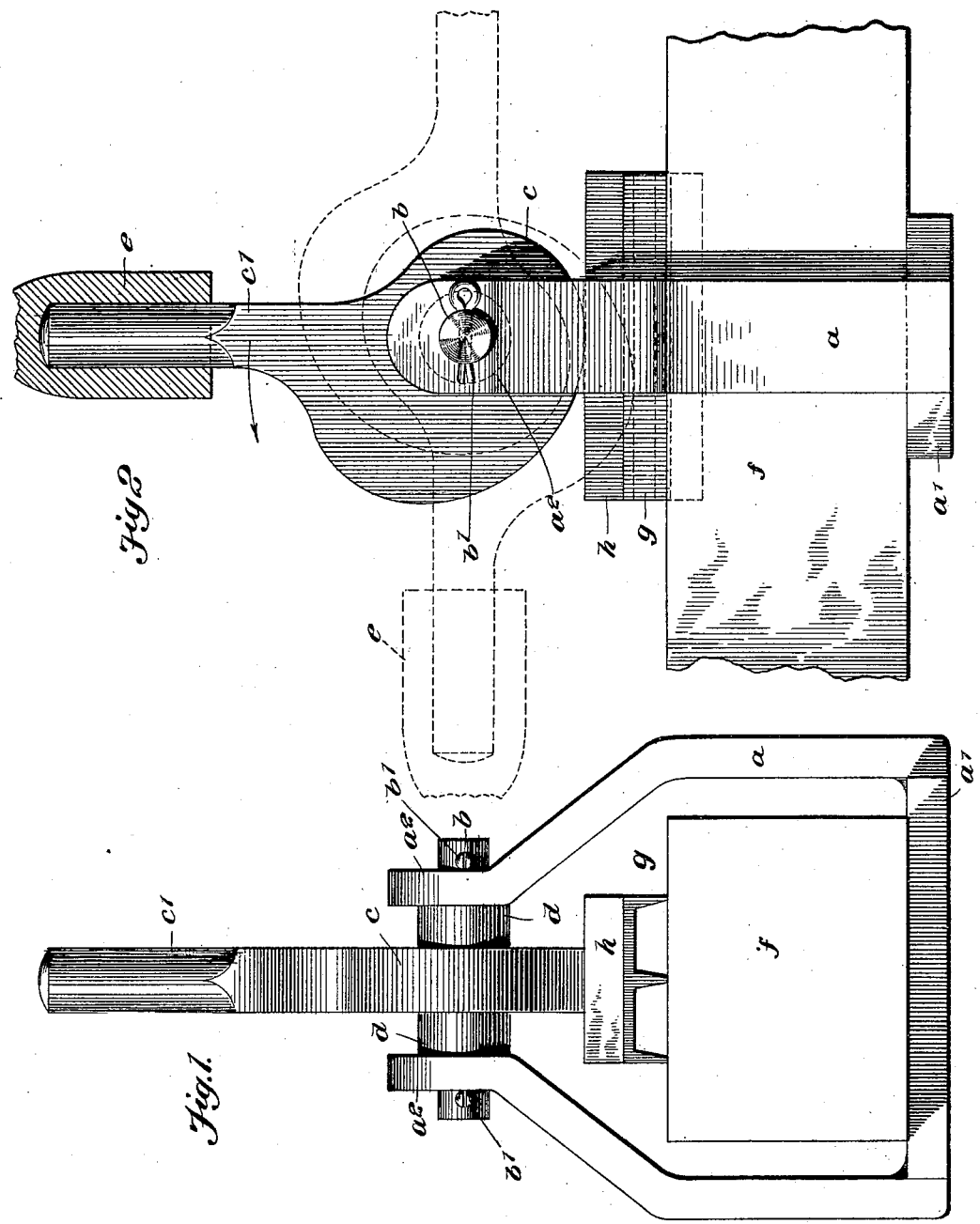

JOHN S. PETER, OF FORT WORTH, TEXAS.

PRESS.

SPECIFICATION forming part of Letters Patent No. 680,542, dated August 13, 1901.

Application filed March 5, 1901. Serial No. 49,760. (No model.)

*To all whom it may concern:*

Be it known that I, JOHN S. PETER, a citizen of the United States, and a resident of Fort Worth, in the county of Tarrant and State of Texas, have invented a new and Improved Press, of which the following is a full, clear, and exact description.

This invention relates to a press adapted particularly for forcing tie-plates into railway-ties.

This specification is a specific description of one form of the invention, while the claim is a definition of the actual scope thereof.

Reference is to be had to the accompanying drawings, forming a part of this specification, in which similar characters of reference indicate corresponding parts in both views.

Figure 1 is a front elevation of the invention, and Fig. 2 is a side elevation thereof.

The press comprises a yoke $a$, with a wide base $a'$, which serves to distribute the pressure evenly on the tie and also to keep the press in upright position on the ground or other surface on which it may be placed. The sides of the yoke $a$ are extended upward in parallelism to form bearings $a^2$, in which is mounted a shaft $b$. This shaft is held by cotter-pins $b'$, and it carries a cam $c$, having a stud-like shank $c'$. The cam $c$ has a steadily-increasing radius somewhat in the form of a spiral, as shown. Arranged on the shaft at each side of the cam $c$ and between the bearings $a^2$ are washers $d$, which keep the cam properly disposed on the shaft $b$. The cam may be turned freely around its axis, as indicated by dotted lines in Fig. 2, and for facilitating applying the necessary force to the cam a hand-lever (indicated at $e$ in Fig. 2) may be engaged with the shank $c'$ by means of a socket on the hand-lever, as shown.

$f$ represents the wooden railway-tie, and $g$ represents the tie-plate, the flanges of which are to be embedded in the tie $f$. Arranged between the tie-plate and cam is a block or stout plate $h$, which serves primarily to bear the pressure of the cam and uniformly to communicate the same to the tie-plate. By throwing the cam to the position indicated by dotted lines at the right of Fig. 2 the parts $g$ and $h$ may easily be placed in position, and then by moving the cam in the direction of the arrow to the position shown by dotted lines at the left of Fig. 2 the action of the cam will force the flanges of the tie-plate into the tie.

Having thus described my invention, I claim as new and desire to secure by Letters Patent—

A tie-plate press, comprising a yoke having bearings at its upper portion, a shaft mounted in the bearings, and a cam carried on the shaft and having a steadily-increasing radius somewhat in the form of a spiral, the cam working with the yoke in the manner explained.

In testimony whereof I have signed my name to this specification in the presence of two subscribing witnesses.

JOHN S. PETER.

Witnesses:
   S. T. G. MOORE,
   T. E. DIETRICH.